United States Patent
Yu et al.

(10) Patent No.: US 10,974,994 B1
(45) Date of Patent: Apr. 13, 2021

(54) CORE-SHELL COMPOSITE MATERIAL AND METHOD FOR MANUFACTURING THE SAME

(71) Applicant: INDUSTRIAL TECHNOLOGY RESEARCH INSTITUTE, Hsinchu (TW)

(72) Inventors: Sheng-Min Yu, Taoyuan (TW); Chien-Chung Hsu, Taichung (TW); Kai-Hsiang Chuang, Hsinchu County (TW); Ming-Hui Chang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/721,581

(22) Filed: Dec. 19, 2019

(30) Foreign Application Priority Data

Nov. 29, 2019 (TW) .................................. 108143640

(51) Int. Cl.
| | |
|---|---|
| *C04B 41/85* | (2006.01) |
| *C04B 35/057* | (2006.01) |
| *C04B 14/36* | (2006.01) |
| *C04B 28/18* | (2006.01) |
| *B05D 1/00* | (2006.01) |
| *C04B 20/10* | (2006.01) |
| *C04B 111/00* | (2006.01) |

(52) U.S. Cl.
CPC ............ *C04B 20/1037* (2013.01); *B05D 1/60* (2013.01); *C04B 14/363* (2013.01); *C04B 28/182* (2013.01); *C04B 2111/00612* (2013.01)

(58) Field of Classification Search
CPC ....... C04B 35/057; C04B 35/10; C04B 35/14; C04B 35/26; C04B 41/84; C04B 41/85; B05D 1/60

See application file for complete search history.

(56) References Cited

U.S. PATENT DOCUMENTS

| | | | |
|---|---|---|---|
| 9,120,125 B2 | 9/2015 | Timmons et al. | |
| 10,204,723 B2 * | 2/2019 | Katusic | .................... C09C 1/24 |
| 10,793,474 B2 * | 10/2020 | Lee | ..................... C04B 33/1352 |
| 2018/0305254 A1 * | 10/2018 | Ben Haha | ............... C04B 7/153 |

FOREIGN PATENT DOCUMENTS

| | | |
|---|---|---|
| CN | 105503040 A | 4/2016 |
| CN | 106542755 B | 1/2019 |
| JP | 2005-523142 A | 8/2005 |
| TW | I400218 B1 | 7/2013 |
| TW | 201410610 A | 3/2014 |
| TW | I529203 B | 4/2016 |

OTHER PUBLICATIONS

Taiwanese Office Action and Search Report for corresponding Taiwanese Application No. 108143640, dated Apr. 28, 2020.
Baoguo Han et al., "Reactive powder concrete reinforced with nano SiO2-coated TiO2", Elsevier, Construction and Building Materials 148 (2017) 104-112.
Dirk Hegemann et al., "Plasma Treatment of Polymers to Generate Stable, Hydrophobic Surfaces", Plasmas and Polymers, vol. 6, No. 4, Dec. 2001, pp. 221-235.
Virginija Jankauskaite et al., "Control of Polydimethylsiloxane Surface Hydrophobicity by Plasma Polymerized Hexamethyldisilazane Deposition", Coatings, 2019, 9, 36, p. 1-p. 7.
Z. Ziari et al., "Chemical and electrical properties of HMDSO plasma coated polyimide", Elsevier, Vacuum vol. 93, Jul. 2013, pp. 31-36.

* cited by examiner

*Primary Examiner* — Vu A Nguyen
(74) *Attorney, Agent, or Firm* — Birch, Stewart, Kolasch & Birch, LLP

(57) ABSTRACT

A method of forming a core-shell composite material includes depositing a polysiloxane shell to wrap a ceramic core via chemical vapor deposition for forming a core-shell composite material, wherein the ceramic core is an oxide of metal and silicon, which includes 100 parts by weight of calcium, 50 to 95 parts by weight of iron, 15 to 40 parts by weight of silicon, 2 to 15 parts by weight of magnesium, 2 to 20 parts by weight of aluminum, and 2 to 10 parts by weight of manganese.

17 Claims, No Drawings

CORE-SHELL COMPOSITE MATERIAL AND METHOD FOR MANUFACTURING THE SAME

CROSS REFERENCE TO RELATED APPLICATIONS

The present application is based on, and claims priority from, Taiwan Application Serial Number 108143640, filed on Nov. 29, 2019, the disclosure of which is hereby incorporated by reference herein in its entirety.

TECHNICAL FIELD

The technical field relates to a core-shell composite material containing a ceramic core and method for manufacturing the same.

BACKGROUND

Ceramic powder is usually added to a building material to increase the strength or to adjust the color (e.g. to black or brown) of the building material, in which the ceramic powder containing spinels of calcium or magnesium may form strong bonds with cement to greatly enhance the cement's strength. Simultaneously, spinels such as $CaFe_2O_4$, $CaMn_2O_4$, or $MgFe_2O_4$ are inherently dark brown or black, which are added to cement to change its color, thereby increasing the color variability of the building material. However, synthesized ceramic powder that contains calcium spinels usually also contains cement phase of dicalcium silicate (C2S) or tricalcium silicate (C3S), which usually expands after being dipped in water. As such, the ceramic powder is often hydrated and cementated during grinding, and this may result in difficulties with dispersing the ceramic powder. In addition, the ceramic powder can be expanded by water, and so it may absorb a lot of water. After absorbing water, the ceramic powder will generate too many pores while drying and sintering, and these pores will influence the structural strength and limit the applications of the ceramic powder. Moreover, when the ceramic powder is added to cement, the ceramic powder will continuously react with water and expand its volume, even expanding and breaking the cement, weakening the building material.

Accordingly, a novel ceramic powder composition and structure is called for to address the above issues.

SUMMARY

One embodiment of the disclosure provides a core-shell composite material, including: a ceramic core; and a polysiloxane shell wrapping the ceramic core, wherein the ceramic core is an oxide of metal and silicon, and the ceramic core includes 100 parts by weight of calcium, 50 to 95 parts by weight of iron, 15 to 40 parts by weight of silicon, 2 to 15 parts by weight of magnesium, 2 to 20 parts by weight of aluminum, and 2 to 10 parts by weight of manganese.

In some embodiments, the ceramic core comprises a plurality of spinels distributed in the ceramic core.

In some embodiments, the ceramic core and the spinels have a weight ratio of 1:0.2 to 1:0.5.

In some embodiments, the ceramic core has a diameter of 0.1 μm to 1000 μm.

In some embodiments, the ceramic core and the polysiloxane shell have a weight ratio of 100:0.1 to 100:10.

In some embodiments, the polysiloxane shell includes Si—O bonds and Si—$CH_3$ bonds, and the Si—O bonds and the Si—CH3 bonds have a weight ratio of 100:3 to 100:30.

In some embodiments, the ceramic core includes 100 parts by weight of calcium, 75 to 95 parts by weight of iron, 19 to 20 parts by weight of silicon, 8 to 10 parts by weight of magnesium, 6 to 19 parts by weight of aluminum, and 6 to 7 parts by weight of manganese.

One embodiment of the disclosure provides a method of forming a core-shell composite material, including: depositing a polysiloxane shell to wrap a ceramic core via chemical vapor deposition for forming a core-shell composite material. The ceramic core is an oxide of metal and silicon, which includes 100 parts by weight of calcium, 50 to 95 parts by weight of iron, 15 to 40 parts by weight of silicon, 2 to 15 parts by weight of magnesium, 2 to 20 parts by weight of aluminum, and 2 to 10 parts by weight of manganese.

In some embodiments, the step of depositing the polysiloxane shell via chemical vapor deposition includes plasma enhanced chemical vapor deposition, high density plasma chemical vapor deposition, sub-atmosphere chemical vapor deposition, or low-pressure chemical vapor deposition.

In some embodiments, the step of depositing the polysiloxane shell via chemical vapor deposition includes providing silane and oxidation reactant.

In some embodiments, the step of depositing the polysiloxane shell via chemical vapor deposition is performed at a temperature of 20° C. to 200° C. under a pressure of 0.001 torr to 760 torr for a period of 1 second to 500 seconds.

In some embodiments, the ceramic core comprises a plurality of spinels distributed in the ceramic core.

In some embodiments, the ceramic core and the spinels have a weight ratio of 1:0.2 to 1:0.5.

In some embodiments, the ceramic core has a diameter of 0.1 μm to 1000 μm.

In some embodiments, the ceramic core and the polysiloxane shell have a weight ratio of 100:0.1 to 100:10.

In some embodiments, the method further includes mixing the core-shell composite material and cement to form a building material.

In some embodiments, the building material comprises calcium silicate board, calcium oxide board, or cement brick.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a method of forming a core-shell composite material, including: depositing a polysiloxane shell to wrap a ceramic core via chemical vapor deposition for forming a core-shell composite material. The ceramic core is an oxide of metal and silicon, which includes 100 parts by weight of calcium, 50 to 95 parts by weight of iron, 15 to 40 parts by weight of silicon, 2 to 15 parts by weight of magnesium, 2 to 20 parts by weight of aluminum, and 2 to 10 parts by weight of manganese. If the iron ratio is too low, the color of the ceramic powder will not be dark enough. If the iron ratio is too high, the ceramic powder density will be too high, thereby increasing the building material weight. If the silicon ratio is too low, the strength of the ceramic powder will not be great enough. If the silicon ratio is too high, the color of the ceramic powder will not be dark enough. If the magnesium ratio is too low, the spinel ratio will be insufficient. If the magnesium ratio is too high, the expandability of the ceramic powder will be increased. If the aluminum ratio is too low, the hardness of the ceramic powder will be insufficient. If the aluminum ratio is too high, the color of the ceramic powder will not be dark enough. If the manganese ratio is too low, the spinel ratio will be insufficient and the color of the ceramic powder will not be dark enough. If the manganese ratio is too high, the density of the ceramic powder will be too high, thereby increasing the building material weight. For example, a calcium source (e.g. calcium carbonate, calcium hydroxide, or calcium oxide), an iron source (e.g. iron powder, iron oxide, or ferrous oxide), a silicon source (e.g. silicon oxide or silicon sand), a magnesium source (e.g. magnesium carbonate, magnesium oxide, or magnesium acetate), an aluminum source (e.g. aluminum nitrate, aluminum hydroxide, or aluminum oxide), and a manganese source (e.g. manganese acetate, manganese dioxide, or manganic oxide) can be mixed according to chemical stoichiometry, and sintered at 1000° C. to 1500° C. for 0.5 hours to 5 hours to form ceramic cores. Alternatively, some raw materials of the above elements may simultaneously contain at least two required elements, such as calcium silicate that simultaneously contains calcium and silicon. If the sintering temperature is too low or the sintering period is too short, the spinel ratio will be insufficient. If the sintering temperature is too high or the sintering period is too long, the volume of the ceramic powder will be too large due to too much grain growth in the ceramic powder, or the ceramic powder will be polluted due to reaction with crucible.

In some embodiments, the step of depositing the polysiloxane shell via chemical vapor deposition includes plasma enhanced chemical vapor deposition, high density plasma chemical vapor deposition, sub-atmosphere chemical vapor deposition, or low-pressure chemical vapor deposition. The chemical vapor deposition is a dry process in which the deposition process does not use water. If the polysiloxane is formed by a sol-gel method or another water-containing process, the ceramic cores will absorb water and form a bulk before being wrapped in the polysiloxane shell. In short, the water-containing process (a wet process) cannot form the core-shell composite material.

In some embodiments, the step of depositing the polysiloxane shell using chemical vapor deposition includes providing silane and oxidation reactant. In one embodiment, the silane can be silane, halosilane, or aminosilane. For example, the silane may include a hydrogen and/or carbon group but be free of halogen. In one embodiment, the silane can be silane ($SiH_4$), disilane ($Si_2H_6$), methylsilane, ethylsilane, isopropylsilane, t-butylsilane, dimethylsilane, diethylsilane, di-t-butylsilane, allylsilane, sec-butylsilane, t-hexylsilane, isoamylsilane, t-butyldisilane, di-t-butyldisilane, tetra-ethyl-ortho-silicate, hexamethyl disiloxane, or the like. The halosilane includes at least one halogen group, and may or may not include hydrogen and/or carbon group. In one embodiment, the halosilane can be iodosilane, bromosilane, chlorosilane, or fluorosilane. Specifically, the chlorosilane can be tetrachlorosilane ($SiCl_4$), trichlorosilnae ($HSiCl_3$), dichlorosilane ($H_2SiCl_2$), chlorosilane ($ClSiH_3$), chloroallylsilane, chloromethyl silane, dichloromethylsilane, chloro dimethylsilane, chloro ethylsilane, t-butylchlorosilane, di-t-butyl chlorosilane, chloro isopropylsilane, chloro-sec-butylsilane, t-butyl dimethyl chlorosilane, t-hexyldimethyl chlorosilane, or the like. The aminosilane includes at least one nitrogen atom bonding with the silicon atom, and may further includes other atoms such as hydrogen, oxygen, halogen, or carbon. For example, the aminosilane can be primary, secondary, tertiary, or quaternary aminosilane (e.g. $H_3SiNH_2$, $H_2Si(NH_2)_2$, $HSi(NH_2)_3$, and $Si(NH_2)_4$), or substituted primary, secondary, tertiary, or quaternary aminosilane (e.g. t-butyl aminosilane, methylaminosilane, bis(t-butylamino) silane butylsilanamine ($SiH_2(NHC(CH_3)_3)_2$, BTBAS), t-butylsilyl carbamate, $SiH(CH_3)$—$(N(CH_3)_2)_2$, $SiHCl$—$(N(CH_3)_2)_2$, $(Si(CH_3)_2NH)_3$, or the like. Alternatively, the aminosilane can be trisilylamine ($N(SiH_3)_3$). In one embodiment, the oxidation reactant is oxygen or nitrous oxide. In one embodiment, the oxidation reactant comes from the oxygen in atmosphere environment, it is unnecessary to provide additional oxygen flow to the chemical vapor deposition chamber.

In some embodiments, the step of depositing the polysiloxane shell via chemical vapor deposition is performed at a temperature of 20° C. to 200° C. under a pressure of 0.001 torr to 760 torr for a period of 1 second to 500 seconds. If the chemical vapor deposition temperature is too low, there will be too much unreacted organic silicon residue: If the chemical vapor deposition temperature is too high, the alkyl group of the shell surface will be too little, thereby lowering the moisture-blocking ability of the polysiloxane shell. If the chemical vapor deposition period is too short, the thickness of the polysiloxane shell will be insufficient and the moisture-blocking ability of the polysiloxane shell will be lowered. If the chemical vapor deposition period is too long, the polysiloxane shell will be too thick and the color of the core-shell composite material will not be dark enough.

In some embodiments, the ceramic core includes a plurality of spinels distributed therein. In some embodiments, the ceramic core and the spinels have a weight ratio of 1:0.2 to 1:0.5. If the spinel ratio is too low, the color of the core-shell composite material will not be dark enough. If the spinel ratio is too high, the density of the core-shell composite material will be too high, thereby increasing the building material weight. The spinel ratio depends on the temperature and period for sintering the ceramic core, and the ratios of the metals in the ceramic core. The spinel ratio will influence the color of the core-shell composite material.

In some embodiments, the ceramic core has a diameter of 0.1 μm to 1000 μm. If the ceramic core is too small, an insufficient shell thickness will lower the moisture-blocking ability of the shell and expand the ceramic core. If the ceramic core is too large, the building material strength cannot be efficiently enhanced by the core-shell composite material.

In some embodiments, the ceramic core and the polysiloxane shell have a weight ratio of 100:0.1 to 100:10. If the polysiloxane shell ratio is too low, the ceramic core will not be completely wrapped in the polysiloxane shell, and the issue of the ceramic core absorbing water to expand cannot be prevented. If the polysiloxane shell ratio is too high, the color of the core-shell composite material will not be dark enough. In some embodiments, the Si—O bond and the Si-alkyl bond (e.g. Si—$CH_3$ bond) have a weight ratio of 100:3 to 100:30. The bond ratio can be determined by FTIR. If the Si-alkyl bond ratio is too low, the moisture-blocking ability of the polysiloxane ratio will be lowered. If the Si-alkyl bond ratio is too high, the hydrophobicity of the core-shell composite material is too high to mix the core-shell composite material with cement or other aqueous slurry.

In some embodiments, the core-shell composite material is further mixed with cement to form a building material. In some embodiments, the building material can be calcium silicate board, calcium oxide board, or cement brick. Because the polysiloxane shells wrap the ceramic cores, the issue of the ceramic cores in the cement absorbing water and expanding (thereby lowering the building material's strength) can be efficiently prevented. On the other hand, the different spinel ratio in the ceramic cores may change the color of the core-shell composite material, which may further adjust the building material's color.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

Calcium carbonate, iron oxide, silicon oxide, magnesium oxide, aluminum oxide, and manganese dioxide were mixed according to chemical stoichiometry, then heated to 1200° C. and sintered for 3 hours to form ceramic cores, which could include an oxide of 100 parts by weight of calcium, 75 parts by weight of iron, 19 parts by weight of silicon, 8 parts by weight of magnesium, 6 parts by weight of aluminum, and 6 parts by weight of manganese. The ceramic cores (particles) were analyzed by XRD to observe diffraction peaks at 30.1 degrees and 35.4 degrees, which means that the ceramic cores had spines therein. The ceramic cores had a diameter of 0.1 µm to 40 µm.

Example 1

The ceramic cores in Comparative Example 1 were put into a chamber of plasma enhanced chemical vapor deposition, in which the plasma power was 250 W. Hexamethyl disiloxane (HMDSO) was introduced into the chamber at a flow rate of 40 g/hr under atmosphere at a pressure of 1 atm to perform chemical vapor deposition, thereby forming polysiloxane shells wrapping each of the ceramic cores to obtain core-shell composite material. The ceramic core and the polysiloxane shell had a weight ratio of about 100:1.1.

The ceramic cores in Comparative Example 1 were pressed into a cylinder having a diameter of 12 mm and a height of 9 mm. The core-shell composite material in Example 1 was also pressed into a cylinder having a diameter of 12 mm and a height of 9 mm. Each of the cylinders was dipped into hot water of 70° C. for 30 minutes and measured the volume expansion ratios of the cylinders after dipping. The cylinder of the ceramic cores had an expansion ratio of 1.43%, and the cylinder of the core-shell composite material had an expansion ratio of 0.44%. Accordingly, a composite material having ceramic cores wrapped in polysiloxane shells (formed by chemical vapor deposition) could prevent the ceramic cores from absorbing water and expanding.

Comparative Example 2

Calcium oxide, ferrous oxide, silicon oxide, magnesium acetate, aluminum hydroxide, and manganese acetate were mixed according to chemical stoichiometry, then heated to 1100° C. and sintered for 5 hours to form ceramic cores, which could include an oxide of 100 parts by weight of calcium, 81 parts by weight of iron, 19 parts by weight of silicon, 10 parts by weight of magnesium, 7 parts by weight of aluminum, and 7 parts by weight of manganese. The ceramic cores (particles) were analyzed by XRD to observe diffraction peaks at 30.1 degrees and 35.4 degrees, which means that the ceramic cores had spines therein. The ceramic cores had a diameter of 1 µm to 50 µm.

Example 2

The ceramic cores in Comparative Example 2 were put into a chamber of plasma enhanced chemical vapor deposition, in which the plasma power was 250 W. HMDSO was introduced into the chamber at a flow rate of 40 g/hr under atmosphere at a pressure of 1 atm to perform chemical vapor deposition, thereby forming polysiloxane shells wrapping each of the ceramic cores to obtain core-shell composite material. The ceramic core and the polysiloxane shell had a weight ratio of about 100:1.21.

The ceramic cores in Comparative Example 2 were pressed into a cylinder having a diameter of 12 mm and a height of 9 mm. The core-shell composite material in Example 2 was also pressed into a cylinder having a diameter of 12 mm and a height of 9 mm. Each of the cylinders was dipped into hot water of 70° C. for 30 minutes and measured the volume expansion ratios of the cylinders after dipping. The cylinder of the ceramic cores had an expansion ratio of 1.32%, and the cylinder of the core-shell composite material had an expansion ratio of 0.26%. Accordingly, a composite material having ceramic cores wrapped in polysiloxane shells (formed by chemical vapor deposition) could prevent the ceramic cores from absorbing water and expanding.

Comparative Example 3

Calcium carbonate, iron powder, silicon oxide, magnesium hydroxide, aluminum nitrate, and manganic oxide were mixed according to chemical stoichiometry, then heated to 1300° C. and sintered for 1 hour to form ceramic cores, which could include an oxide of 100 parts by weight of calcium, 95 parts by weight of iron, 20 parts by weight of silicon, 8 parts by weight of magnesium, 19 parts by weight of aluminum, and 6 parts by weight of manganese. The ceramic cores (particles) were analyzed by XRD to observe diffraction peaks at 30.1 degrees and 35.4 degrees, which means that the ceramic cores had spines therein. The ceramic cores had a diameter of 0.8 µm to 30 µm.

Example 3

The ceramic cores in Comparative Example 3 were put into a chamber of plasma enhanced chemical vapor deposition, in which the plasma power was 250 W. HMDSO was introduced into the chamber at a flow rate of 40 g/hr under atmosphere at a pressure of 1 atm to perform chemical vapor deposition, thereby forming polysiloxane shells wrapping each of the ceramic cores to obtain core-shell composite material. The ceramic core and the polysiloxane shell had a weight ratio of about 100:1.23.

The ceramic cores in Comparative Example 3 were pressed into a cylinder having a diameter of 12 mm and a height of 9 mm. The core-shell composite material in Example 3 was also pressed into a cylinder having a diameter of 12 mm and a height of 9 mm. Each of the cylinders was dipped into hot water of 70° C. for 30 minutes and measured the volume expansion ratios of the cylinders after dipping. The cylinder of the ceramic cores had an expansion ratio of 0.99%, and the cylinder of the core-shell composite material had an expansion ratio of 0.26%. Accordingly, a composite material having ceramic cores wrapped in polysiloxane shells (formed by chemical vapor deposition) could prevent the ceramic cores from absorbing water and expanding.

TABLE 1

|  | Expansion ratio |
|---|---|
| Example 1 | 0.44% |
| Comparative Example 1 | 1.43% |
| Example 2 | 0.26% |
| Comparative Example 2 | 1.32% |
| Example 3 | 0.26% |
| Comparative Example 3 | 0.99% |

Example 4

100 parts by weight of cement, 100 parts by weight of marble powder, and 50 parts by weight of water were mixed and cured, and the cured product had a Vickers hardness (Hv) of about 40 Hv. 100 parts by weight of cement, 100 parts by weight of the ceramic cores in Comparative Example 3, and 50 parts by weight of water were mixed and cured, and the cured product had a Vickers hardness (Hv) of about 90 Hv. 100 parts by weight of cement, 100 parts by weight of the core-shell composite material in Example 3, and 50 parts by weight of water were mixed and cured, and the cured product had a Vickers hardness (Hv) of about 140 Hv. Accordingly, the core-shell composite material could efficiently improve the structural strength of the cement.

TABLE 2

| Composition | Vickers hardness (HV) |
|---|---|
| cement, marble powder, and water | 40 |
| cement, ceramic cores, and water | 90 |
| cement, core-shell composite material, and water | 140 |

Comparative Example 4

Calcium carbonate, iron oxide, silicon oxide, magnesium acetate, aluminum acetate, and manganic acetate were mixed according to chemical stoichiometry, then heated to 1250° C. and sintered for 1 hour to form ceramic cores, which could include an oxide of 100 parts by weight of calcium, 70 parts by weight of iron, 25 parts by weight of silicon, 5 parts by weight of magnesium, 5 parts by weight of aluminum, and 5 parts by weight of manganese. The ceramic cores (particles) were analyzed by XRD to observe diffraction peaks at 30.1 degrees and 35.4 degrees, which means that the ceramic cores had spines therein. The ceramic cores had a diameter of 1 μm to 30 μm.

The ceramic cores were added into an aqueous sol of HMDSO, and a little acid was added to the aqueous sol of HDMSO, such that the HDMSO was polymerized to form polysiloxane. The above method is so-called sol-gel reaction. However, the ceramic cores absorbed water and aggregated to from ceramic bulk, such that the polysiloxane layer wrapped the ceramic bulk rather than ceramic cores (particles). After crushing the bulk to form powder, most of the powder surface was not wrapped in the polysiloxane layer. The powder was pressed into a cylinder having a diameter of 12 mm and a height of 9 mm. Each of the cylinders was dipped into hot water of 70° C. for 30 minutes and measured the volume expansion ratios of the cylinders after dipping. The cylinder of the powder had an expansion ratio of 1.6%, which was similar to the expansion ratio of the cylinder composed of the ceramic cores not modified by the sol-gel reaction (e.g. Comparative Example 1).

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A core-shell composite material, comprising:
   a ceramic core; and
   a polysiloxane shell wrapping the ceramic core,
   wherein the ceramic core is an oxide of metal and silicon, and the ceramic core includes 100 parts by weight of calcium, 50 to 95 parts by weight of iron, 15 to 40 parts by weight of silicon, 2 to 15 parts by weight of magnesium, 2 to 20 parts by weight of aluminum, and 2 to 10 parts by weight of manganese.

2. The core-shell composite material as claimed in claim 1, wherein the ceramic core comprises a plurality of spinels distributed in the ceramic core.

3. The core-shell composite material as claimed in claim 2, wherein the ceramic core and the spinels have a weight ratio of 1:0.2 to 1:0.5.

4. The core-shell composite material as claimed in claim 1, wherein the ceramic core has a diameter of 0.1 μm to 1000 μm.

5. The core-shell composite material as claimed in claim 1, wherein the ceramic core and the polysiloxane shell have a weight ratio of 100:0.1 to 100:10.

6. The core-shell composite material as claimed in claim 1, wherein the polysiloxane shell includes Si—O bonds and Si—CH$_3$ bonds, and the Si—O bonds and the Si—CH$_3$ bonds have a weight ratio of 100:3 to 100:30.

7. The core-shell composite material as claimed in claim 1, wherein the ceramic core includes 100 parts by weight of calcium, 75 to 95 parts by weight of iron, 19 to 20 parts by weight of silicon, 8 to 10 parts by weight of magnesium, 6 to 19 parts by weight of aluminum, and 6 to 7 parts by weight of manganese.

8. A method of forming a core-shell composite material, comprising:
   depositing a polysiloxane shell to wrap a ceramic core via chemical vapor deposition for forming a core-shell composite material,
   wherein the ceramic core is an oxide of metal and silicon, which includes 100 parts by weight of calcium, 50 to 95 parts by weight of iron, 15 to 40 parts by weight of silicon, 2 to 15 parts by weight of magnesium, 2 to 20 parts by weight of aluminum, and 2 to 10 parts by weight of manganese.

9. The method as claimed in claim 8, wherein the step of depositing the polysiloxane shell via chemical vapor deposition includes plasma enhanced chemical vapor deposition, high density plasma chemical vapor deposition, sub-atmosphere chemical vapor deposition, or low-pressure chemical vapor deposition.

10. The method as claimed in claim 8, wherein the step of depositing the polysiloxane shell via chemical vapor deposition includes providing silane and oxidation reactant.

11. The method as claimed in claim 8, wherein the step of depositing the polysiloxane shell via chemical vapor deposition is performed at a temperature of 20° C. to 200° C. under a pressure of 0.001 torr to 760 torr for a period of 1 second to 500 seconds.

12. The method as claimed in claim 8, wherein the ceramic core comprises a plurality of spinels distributed in the ceramic core.

13. The method as claimed in claim 12, wherein the ceramic core and the spinels have a weight ratio of 1:0.2 to 1:0.5.

14. The method as claimed in claim 8, wherein the ceramic core has a diameter of 0.1 μm to 1000 μm.

15. The method as claimed in claim 8, wherein the ceramic core and the polysiloxane shell have a weight ratio of 100:0.1 to 100:10.

16. The method as claimed in claim 8, further comprising mixing the core-shell composite material and cement to form a building material.

17. The method as claimed in claim 16, wherein the building material comprises calcium silicate board, calcium oxide board, or cement brick.

* * * * *